(12) United States Patent
Pyper et al.

(10) Patent No.: US 9,381,560 B2
(45) Date of Patent: *Jul. 5, 2016

(54) LOW PROFILE PILOT ASSEMBLY AND METHOD FOR METAL FORMING DIES

(71) Applicant: Standard Lifters, Inc., Grand Rapids, MI (US)

(72) Inventors: Joel T. Pyper, Grand Rapids, MI (US); Scott M. Breen, Marne, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,445

(22) Filed: Jun. 10, 2015

(65) Prior Publication Data

US 2015/0273561 A1  Oct. 1, 2015

Related U.S. Application Data

(63) Continuation of application No. 14/460,583, filed on Aug. 15, 2014, now Pat. No. 9,067,253, which is a continuation of application No. 13/971,343, filed on Aug. 20, 2013, now Pat. No. 8,844,335.

(60) Provisional application No. 61/684,892, filed on Aug. 20, 2012.

(51) Int. Cl.
  *B21D 37/08*   (2006.01)
  *B23P 15/24*   (2006.01)
  *B21D 43/06*   (2006.01)

(52) U.S. Cl.
  CPC .............. *B21D 37/08* (2013.01); *B21D 43/06* (2013.01); *B23P 15/24* (2013.01)

(58) Field of Classification Search
  CPC .......... B21D 37/08; B21D 43/06; B23P 15/24
  USPC ...................................................... 72/405.14
  See application file for complete search history.

(56) References Cited

U.S. PATENT DOCUMENTS

| 4,342,214 A | 8/1982 | Neuendorf |
| 4,644,836 A | 2/1987 | Wepner |

(Continued)

FOREIGN PATENT DOCUMENTS

| JP | 56084130 | 9/1981 |
| JP | 56122634 | 9/1981 |

(Continued)

OTHER PUBLICATIONS

Standard Lifters Inc., "Pilot Assembly," sales brochure, Grand Rapids, Michigan, USA (Oct. 2011).

(Continued)

*Primary Examiner* — David B Jones
(74) *Attorney, Agent, or Firm* — Price Heneveld LLP

(57) ABSTRACT

A pilot assembly and method for metal forming dies has a generally cylindrical pilot with a stripper that strips stock from the pilot when metal forming dies diverge. The pilot assembly is secured to one die member by a fastener by itself or in combination with a window mount. A spring within the pilot assembly contacts the stripper to force the stripper to reciprocate when the dies are pulled apart. Thus, the pilot assembly helps locate the stock within the metal forming die while also having a stripper to help strip the stock from the pilot.

20 Claims, 10 Drawing Sheets

(56) References Cited

U.S. PATENT DOCUMENTS

| | | | |
|---|---|---|---|
| 4,916,931 A | 4/1990 | Kaeseler | |
| 5,860,315 A | 1/1999 | Sawdon | |
| 8,844,335 B2 * | 9/2014 | Pyper | B21D 37/08 72/405.06 |
| 9,067,253 B2 * | 6/2015 | Pyper | B21D 37/08 |

FOREIGN PATENT DOCUMENTS

| | | |
|---|---|---|
| JP | 57100825 | 6/1982 |
| JP | 06142788 | 5/1994 |
| KR | 1020010069897 | 7/2001 |
| KR | 1020060104028 | 10/2006 |
| KR | 100766072 | 10/2007 |
| SU | 1061886 A1 | 12/1983 |
| SU | 1822811 A1 | 6/1993 |

OTHER PUBLICATIONS

Standard Lifters Inc., "Pilot Sleeve," sales brochure, Grand Rapids, Michigan, USA (Jan. 2012).

Fibro Inc., "Pilot Units to Daimler Standard," catalog, p. E72, Rockford, Illinois, USA (date unknown).

Dayton Progress Corporation, "Regular Pilots," pp. 9, 11, 13, Dayton, Ohio, USA (date unknown).

AJACS Die Sales Corporation, "Pilot Retainer," sales brochure, Grand Rapids, Michigan, USA (date unknown).

Misumi Corporation, "Pilot Punches," catalog, pp. 202, 220, 228, 234, 242, 946, 948, Schaumburg, Illinois, USA (date unknown).

Modern Die Systems Inc., "Die Accessories," sales brochure, Ellwood, Indiana, USA (date unknown).

\* cited by examiner

LOW PROFILE PILOT ASSEMBLY AND METHOD FOR METAL FORMING DIES

CROSS REFERENCE TO RELATED APPLICATION AND CLAIM TO PRIORITY

The present application is a continuation of commonly assigned, U.S. patent application Ser. No. 14/460,583, filed Aug. 15, 2014, (now U.S. Pat. No. 9,067,253, issued Jun. 30, 2015), entitled LOW PROFILE PILOT ASSEMBLY AND METHOD FOR METAL FORMING DIES, which is a continuation of commonly assigned U.S. patent application Ser. No. 13/971,343, filed Aug. 20, 2013 (now U.S. Pat. No. 8,844,335, issued Sep. 30, 2014), entitled LOW PROFILE PILOT ASSEMBLY AND METHOD FOR METAL FORMING DIES, which claims priority under 35 U.S.C. §119 to U.S. Provisional Application No. 61/684,492, filed Aug. 20, 2012, all of which are incorporated herein by reference.

BACKGROUND OF THE INVENTION

The present invention relates to metal forming dies and the like, and in particular to a low profile pilot assembly and associated method.

Metal forming dies, such as stamping dies and the like, are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming processes have typically been individually designed, one of a kind assemblies for a particular part, with each of the various components being handcrafted and custom mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, pilots, etc. are also custom designed, and installed in the die set. Current die making processes require carefully machined, precision holes and recesses in the die set for mounting the individual components, such that the same are quite labor intensive, and require substantial lead time to make, test and set up in a stamping press. Consequently, such metal forming dies are very expensive to design, manufacture, and repair or modify.

Pilot assemblies, such as that disclosed in U.S. Pat. No. 4,342,214, are used for locating a work piece in successive forming stages of a machine, such as a punch press, where the work piece is progressively moved through the forming stages of the machine. The pilot assembly typically includes a pilot pin mounted to a movable die member of the machine for guiding entry into a previously formed hole in a work piece or in a companion die member as the die members are moved toward each other, the pin being axially retractable in its mounting in the event that it strikes an obstruction. The retraction movement of the pin may be controlled by a spring or a hydraulic mechanism which includes a hydraulic chamber formed behind the pin into which the pin moves to displace a hydraulic fluid therefrom.

FIGS. 9-14 illustrate several well-known prior art metal forming dies and associated pilot mechanisms, which further represent the background of the present invention. For example, FIG. 9 illustrates one half of a die set 100, which includes a first die member 101 having a plurality of longitudinally spaced apart work stations 102 at which various bending, forming, cut-off and/or punching operations are performed on an elongate strip of metal stock 103. As best illustrated in FIG. 10, the prior art pilot mechanism 104 for the illustrated die set 100 includes a pierce tool punch 105 located at an upstream portion of stock strip 103, which, in the illustrated example, forms a vertically oriented through hole 106 in the stock strip 103 at regularly spaced apart intervals along the stock strip. The through holes or pilot holes 106 are selectively engaged by a series of pilot pins 107 positioned on at least selected ones of the die work stations 102, which serve to precisely locate the stock strip 103 in the work stations, and retain the same in place during the metal forming stroke of the die tools. After each metal forming stroke of the die tools, the pilot pins 107 are retracted out of their associated pilot holes 106 in the stock strip 103, and the stock strip 103 is then shifted longitudinally to the next adjacent work station 102, until the metal part has been completely formed and cut off of the stock strip. When the pilot pins 107 are retracted out of the pilot holes 106 in the stock strip 103, the stock strip tends to stick on one or more of the pilot pins, thereby requiring some type of stripper mechanism to separate them, such that the stock strip can be quickly and sequentially advanced longitudinally through the various die stations.

FIG. 11 illustrates another known prior art pilot assembly that includes a rectangularly shaped block or base 111 that is mounted in a blind hole pocket 112 in an associated upper die member 113. The base block 111 includes a central aperture 114 in which a pilot pin 115 is retained, and two laterally offset reaction apertures 116 in which a pair of stripper assemblies are received and retained. A female punch tool 117 is positioned in the lower die member 122, and closely receives the pilot pin 115 to precisely locate the stock strip 103 in the associated work station. Each of the stripper assemblies comprises a plunger shaped rod 118 having an outer end 119 protruding outwardly from base block 111 toward the stock strip 103, and an inner end 120 with a coil spring 121 received thereover which resiliently urges the rods 118 outwardly on opposite sides of pilot pin 115, and serve to strip the stock strip 103 from the exterior surface of the pilot pin 115 as the pilot pin and associated upper die member 113 are raised to a diverged condition relative to the lower die member 122.

FIG. 12 illustrates yet another known prior art pilot assembly, which includes an enlarged, flat mounting plate 126 which attaches to the upper surface 127 of the upper die member 113 using a pair of cap head screws 128 having threaded shanks 129 that are anchored in the upper die member 113. The upper die member 113 includes a central aperture 114 in which a pilot pin 115 is received and retained, along with a pair of reaction apertures 116 disposed on opposite sides of pilot pin 115, each of which receives and retains therein a plunger shaped rod 118. The outer ends 119 of the rods 118 protrude outwardly from the lower surface of upper die member 113, while the inner ends 120 of rods 118 have coil springs 121 received thereon which resiliently urge rods 118 outwardly, such that the outer ends 119 of rods 118 serve to strip the stock strip 103 away from the exterior surface of the pilot pin 115, and thereby permit the stock strip 103 to be shifted longitudinally into the next adjacent work station.

FIGS. 13 and 14 illustrate yet another known prior art pilot assembly which includes a rectangular shaped block or base 111 that is mounted on to the lower surface 133 of the upper die member 113 using fasteners 134. In addition, dowels 135 may be used to help locate and secure the base block 111 in dowel holes 136 in the upper die member 113 and/or dowel holes 137 in the base block 111. The base block 111 includes a central aperture 114 in which a pilot pin 115 is retained, and two laterally offset reaction apertures 116 in which a pair of stripper assemblies are received and retained. A female punch tool 117 is positioned in the lower die member 122, and closely receives the pilot pin 115 to precisely locate stock strip 103 in the associated work station. Each of the stripper assemblies comprises a plunger shaped rod 118 having an outer end 119 protruding outwardly from base block 111 toward the stock strip 103, and an inner end 120 with a coil spring 121 received there over which resiliently urges the rods 118 outwardly on opposite sides of the pilot pin 115 and serve to strip the stock strip 103 from the exterior surface of the pilot pin 115 as the pilot pin and associated upper die member 113 are raised to a diverged condition relative to the lower die member 122.

Large manufacturers of formed metal parts, such as those which supply parts to automobile companies and the like, have an extensive inventory of metal forming dies and related metal handling machinery. Through the years, such companies have standardized several different styles and sizes of pilot punches and associated pins for use with their various dies, so as to maximize efficiencies when combining various tooling for a specific project. Similarly, the metal forming die industry generally has adopted such standard pilot punch and pin sizes and shapes to minimize the effort and expense of making, installing and maintaining the dies and related metal handling equipment. When a new die is designed and fabricated by a tool and die maker, the customer will often specify that the die maker use a specific shape and size of pilot punching pin, which is often one of several styles that are standard or non-custom, and are commercially readily available. Sometimes, the customer will actually provide to the die maker the pilot punch and pilot pins that it desires to be incorporated into a specific progressive metal forming die, or portion thereof.

While such prior pilot assemblies have proven generally successful, they are rather expensive and time consuming to construct and install in an associated die set, such that further improvements and enhancements to the same, as well as metal forming dies generally, would be clearly advantageous, and are disclosed herein.

SUMMARY OF THE INVENTION

One aspect of the present invention is a multi-station progressive metal forming die having at least two mutually converging and diverging die members between which an elongated stock strip is shifted longitudinally to form parts from the stock strip, along with an improved modular pilot assembly. The pilot assembly includes a generally cylindrically shaped pilot configured for operable support on one of the die members. The pilot has an outer end portion oriented toward the stock strip, an oppositely disposed inner end portion oriented away from the stock strip, and a medial portion disposed axially between the outer and inner end portions. The medial portion has an annular groove. The outer end portion has a generally tapered nose, with a circularly shaped innermost portion configured for close reception in a pilot hole in the stock strip, and a generally conically shaped outermost portion configured to engage the pilot hole in the stock strip and guide the same to a predetermined position in an associated die forming station. The inner end portion has a generally cylindrical shape, with a flat surface for engaging a surface of the one die member. A spring member having a generally hollow interior is received over the medial portion of the pilot. The spring member has an outer end oriented toward the stock strip, and an opposite inner end oriented away from the stock strip and positioned adjacent a surface on the pilot. A stripper has an outer collar portion with an outer end surface oriented toward the stock strip and a generally cylindrical first sidewall with a first outside diameter. The stripper also has an inner collar portion with an inner end surface oriented away from the stock strip with a generally cylindrical second sidewall having a second outside diameter which is less than the first outside diameter of the first sidewall of the outer collar portion to define an annularly shaped, radially oriented shoulder there between for engaging the outer end of the spring member. The stripper is received over the medial portion of the pilot. The outer collar portion of the stripper also has a first inner diameter and the inner collar portion has a second inner diameter which is less than the first inner diameter to define an annularly shaped, radially oriented inner shoulder there between. A retainer operably connected on the annular groove of the medial portion of the pilot maintains the stripper on the pilot assembly by engaging the inner shoulder of the stripper when the die members are diverged.

Yet another aspect of the present invention is a modular pilot assembly for multi-station progressive metal forming dies having at least two mutually converging and diverging die members between which an elongate stock strip is shifted longitudinally to form parts from the stock strip. The pilot assembly includes a generally cylindrically shaped pilot configured for operable support on one of the die members. The pilot has an outer end portion oriented toward the stock strip, an oppositely disposed inner end portion oriented away from the stock strip, and a medial portion disposed axially between said outer and inner end portions. The medial portion has an annular groove. The outer end portion has a generally tapered nose, with a circularly shaped innermost portion configured for close reception in a pilot hole in the stock strip, and a generally conically shaped outermost portion configured to engage the pilot hole in the stock strip and guide the same to a predetermined position in an associated die forming station. The inner end portion has a generally cylindrical shape, with a flat surface for engaging a surface of the one die member. The assembly includes a spring member having a generally hollow interior that is received over the medial portion of the pilot, with an outer end oriented toward the stock strip, and an opposite inner end oriented away from the stock strip and positioned adjacent a surface on the pilot. The assembly also includes a stripper with an outer collar portion with an outer end surface oriented toward the stock strip and a generally cylindrical first sidewall with a first outside diameter, and an inner collar portion with an inner end surface oriented away from the stock strip. The inner collar portion has a generally cylindrical second sidewall with a second outside diameter which is less than the first outside diameter to define an annularly shaped, radially oriented shoulder there between for engaging the outer end of the spring member. The stripper is received over the medial portion of the pilot. The outer collar portion of the stripper has a first inner diameter and the inner collar portion has a second inner diameter which is less than said first inner diameter to define an annularly shaped, radially oriented inner shoulder there between. A retainer is operably connected on the annular groove of the medial portion of the pilot to maintain the stripper on the pilot assembly by engaging the inner shoulder of the stripper when the die members are diverged.

Yet another aspect of the present invention is a method for making a multi-station progressive metal forming die having at least two mutually converging and diverging die members between which an elongate stock strip is shifted longitudinally to form parts from the stock strip, with the improvement of at least one modular pilot for precisely locating the stock strip in the die stations. The method includes forming a generally cylindrically shaped pilot for operable support on one of the die members with an outer end portion oriented toward the stock strip, an oppositely disposed inner end portion oriented away from the stock strip, and a medial portion disposed axially between the outer and inner end portions. The method includes forming an annular groove on the medial portion of the pilot. The method also includes forming the outer end portion with a generally tapered nose with a circularly shaped innermost portion configured for close reception in a pilot hole in the stock strip, and a generally conically shaped outermost portion configured to engage the pilot hole in the stock strip and guide the same to a predetermined position in an associated die forming station. The method includes forming the inner end portion with a generally cylindrical shape, with at least one flat surface for engaging a surface of the one die member. The method further includes selecting a spring member with a generally hollow interior. The method includes positioning the hollow interior of the spring member onto and over the medial portion of the pilot so that the outer end of the spring member is oriented toward the stock strip, and the opposite inner end is oriented away from the stock strip. The method includes forming a stripper with an outer collar portion with an outer end surface oriented toward the stock strip and a generally cylindrical first sidewall with a first outside diameter, an inner collar portion with an inner end surface oriented away from the stock strip with a generally cylindrical second sidewall with a second outside diameter which is less than the first outside diameter to define an annularly shaped, radially oriented shoulder there between for engaging the outer end of the spring member. The method includes forming the outer collar portion to have a first inner diameter and forming the inner collar portion to have a second inner diameter which is less than the first inner diameter to define an annularly shaped, radially oriented inner shoulder there between. The method includes positioning the stripper over the pilot. The method further includes selecting a retainer ring that fits securely onto the annular groove on the medial portion of the pilot and positioning the retainer ring on the annular groove to maintain the stripper on the pilot assembly by engaging the inner shoulder of the stripper when the die members are diverged.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal" and derivatives thereof shall relate to the invention as oriented in FIGS. 1, 2, 3A, and 4-26. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
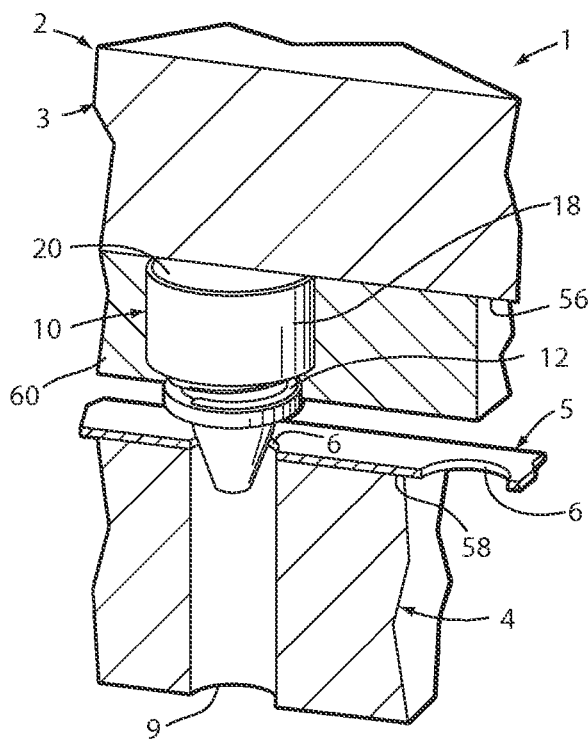
FIG. 1 is a perspective view of a modular pilot assembly embodying the present invention, shown installed in a die set carrying a stock strip in which pilot holes have been formed.

The reference numeral 1 (FIGS. 1-4 and 6-8) generally designates a modular pilot assembly embodying an aspect of the present invention. As shown in FIG. 1, the pilot assembly 1 is particularly adapted for use in conjunction with a multi-station progressive metal forming die 2, having at least two mutually converging and diverging die members 3 and 4, between which an elongate stock strip 5 is shifted longitudinally to form parts from the stock strip.

Figure 2:
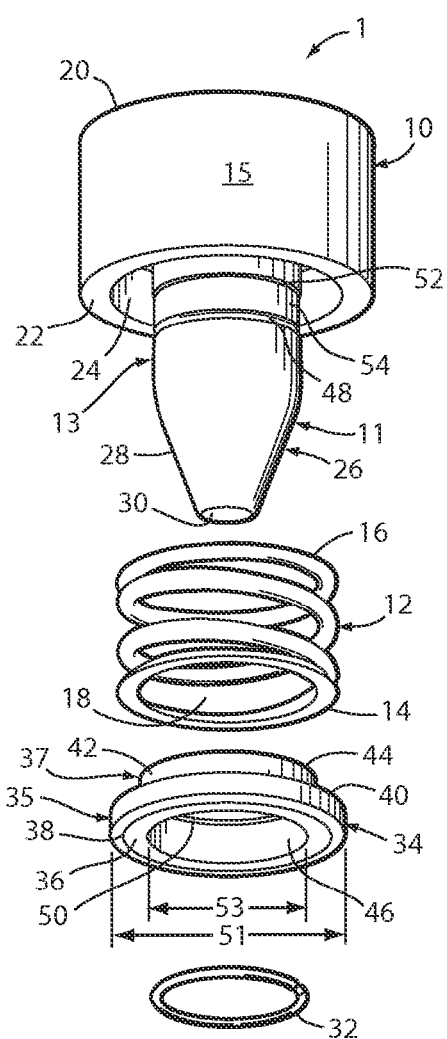
FIG. 2 is an exploded perspective view of the pilot assembly shown in FIG. 1.
Figure 3:
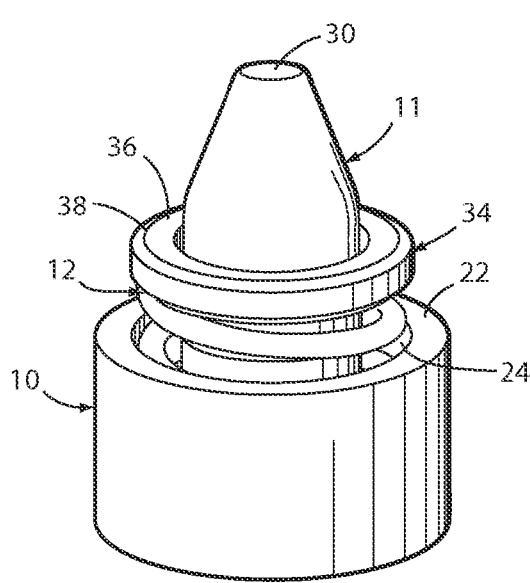
FIG. 3 is a perspective view of the pilot assembly in an assembled condition, taken from an outer end thereof.
Figure 3A:
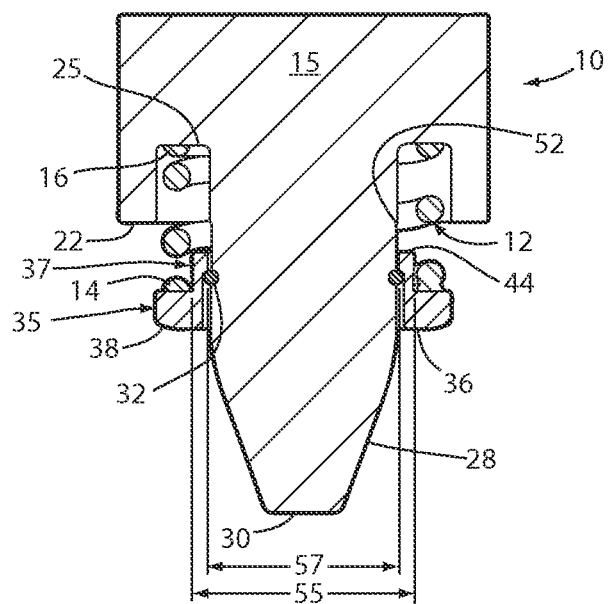
FIG. 3A is a vertical cross-sectional view of the portion of the pilot assembly shown in FIG. 3 when the pilot assembly is in a position for installation on an upper die member.
Figure 4:
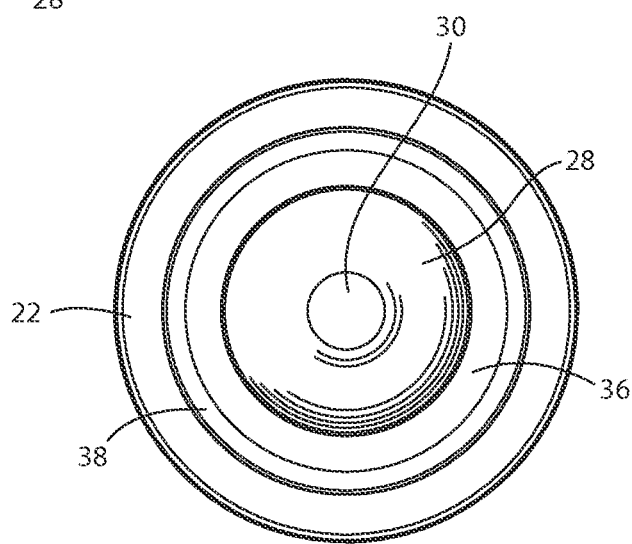
FIG. 4 is a top plan view of the pilot assembly as shown in the orientation of FIG. 3.
Figure 5:
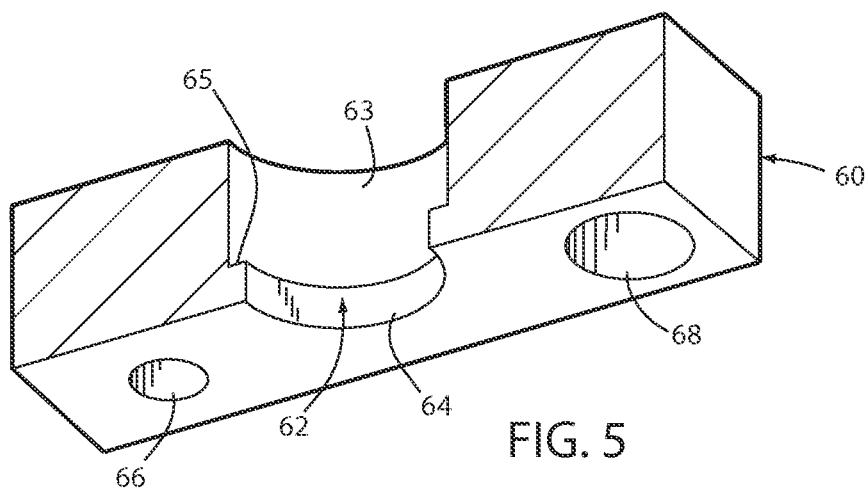
FIG. 5 is a perspective cross-elevational view of the apertures in the window mount.

The modular pilot assembly 1 includes a generally cylindrically shaped pilot 10 operably supported on one of the die members 3. The pilot includes an outer end portion 11 oriented toward the stock strip 5, an oppositely disposed inner end portion 15 oriented away from the stock strip 5, and a medial portion 13 disposed axially between said outer 11 and inner 15 end portions. The medial portion 13 has a generally cylindrical wall 54 with an annular groove 48. Also, as illustrated in FIGS. 2 and 3A, the medial portion 13 of the pilot 10 can be tapered to create a necked portion 52 that would have a smaller cross-sectional area. The outer end portion 11 of the pilot has a generally cylindrical shape where the medial portion 13 transitions to the outer end portion 11. The outer end portion 11 then transitions to a generally tapered nose 28 with a generally frusto-conically shaped outermost portion 26, with a tip 30, configured to engage the pilot hole 6 in the stock strip 5 and guide the same to a predetermined position in an associated die forming station. The inner end portion 15 of the pilot has a generally cylindrical shape with a flat surface 20 for engaging a surface on the die member 3. The inner end portion also has an inner facing surface 22 that can engage a surface for mounting the pilot 10 to the one die member 3 by way of a window 60 that is fastened to the one die member or by way of a fastener as discussed herein. A channel 24 may be formed within the inner end portion 15 for receiving a portion of the spring member 12.

A spring member 12 has an inner end surface 16 and an outer end surface 14 and a generally hollow interior 18. The spring member is received over the medial portion 13 of the pilot 10. The inner end surface 16 of the spring member 12 can be closely received within the channel 24 in the inner end portion 15 of the pilot 10 such that it abuts surface 25 in the channel 24.

The pilot assembly 1 includes a stripper 34 that has an outer collar 35 and an inner collar 37. The outer collar 35 has an outer end surface 36 that can include a tapered edge 38 and an inner end surface 44. The outer collar 35 has an outer diameter 51 and an inner diameter 53 as shown in FIG. 2. The inner collar 37 includes an outer diameter 55 and an inner diameter 57 as shown in FIG. 3A. A generally annularly shaped, radially-oriented shoulder 40 on the stripper 34 engages the outer end portion 14 of spring 12 when the stripper 34 is installed on the pilot 10. A generally annularly shaped, radially-oriented inner shoulder 50 is formed on the stripper 34 due to the difference between the inner diameter 57 of the inner collar 37 and the inner diameter 53 of the outer collar 35. When the stripper 34 is installed in the pilot assembly 1, the interior 46 of the stripper 34 will closely surround the pilot 10 as shown in FIGS. 3 and 3A.

A retainer ring 32 is received on the annular groove 48 on the medial portion 13 of the pilot 10. The retainer ring 32 engages the inner shoulder 50 of the stripper 34 to retain the stripper 34 on the pilot 10 when the die members 3, 4 diverge. The outer wall 42 of the inner collar 37 of the pilot 34 may be closely received within the interior 18 of the spring member 12. The retainer ring 32 may be any ring that can be closely received on the groove 48 and remain engaged in the groove during operation of the die 2. For example, the ring 32 can be a steel C-ring.

Figure 6:
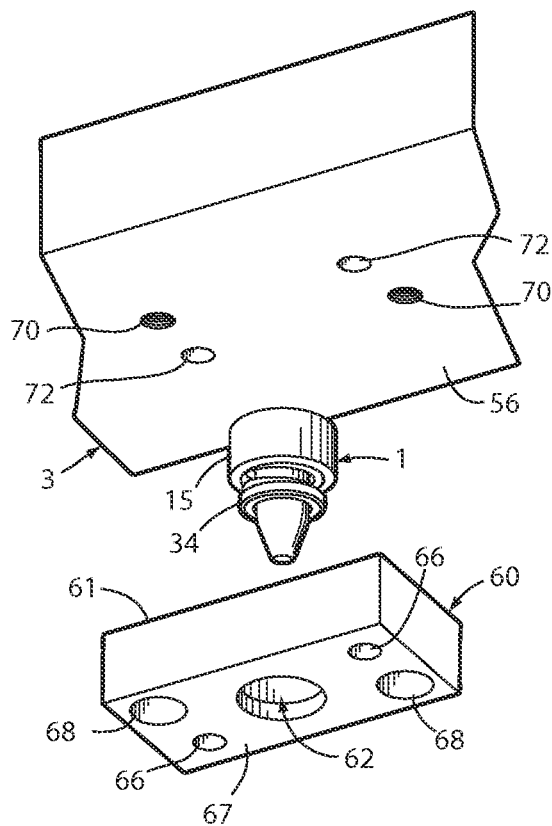
FIG. 6 is a perspective view of the pilot assembly prior to installation on the upper die member.
Figure 7:
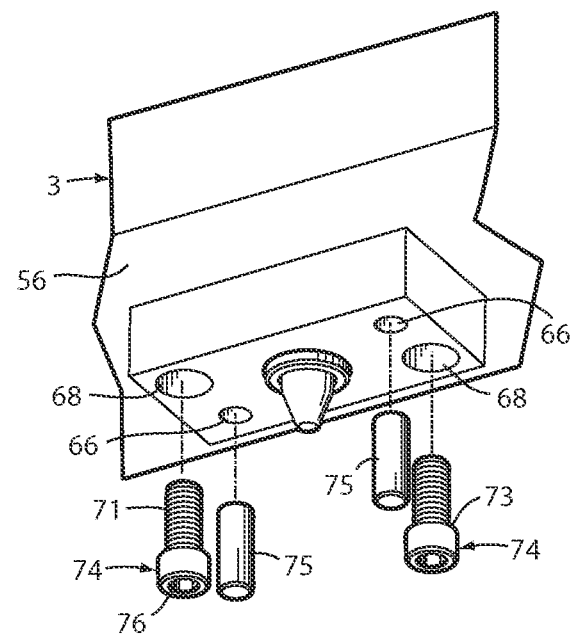
FIG. 7 is a perspective view of the pilot assembly partially installed on the die member.
Figure 8:
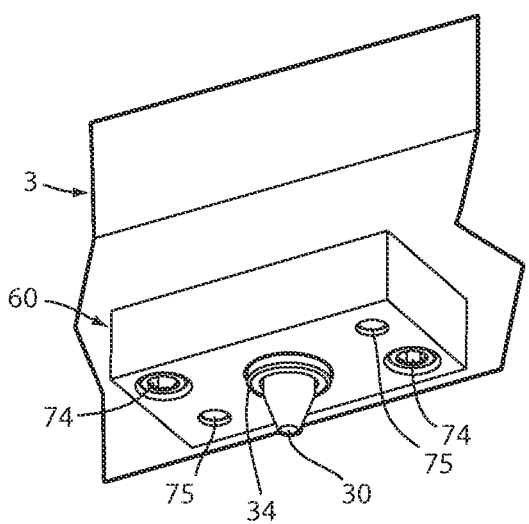
FIG. 8 is a perspective view of the pilot assembly installed on the die member.
Figure 9:
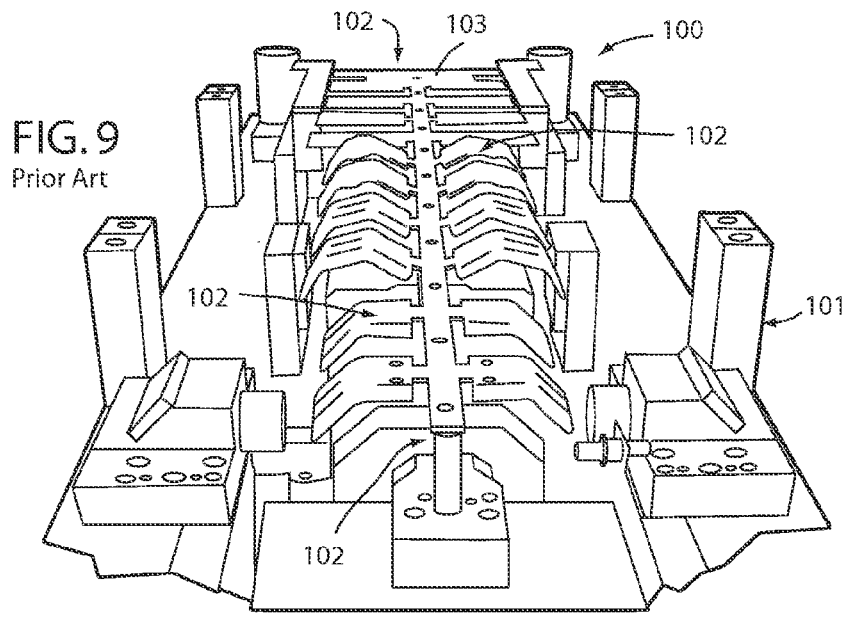
FIG. 9 is a partially schematic perspective view of a representative prior art die member shown in an open condition with a stock strip positioned along the various work stations in the die member.
Figure 10:
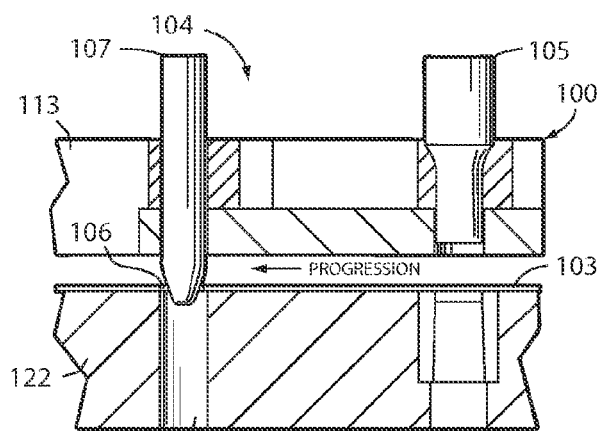
FIG. 10 is a partially schematic cross-sectional view of a prior art pilot.
Figure 11:
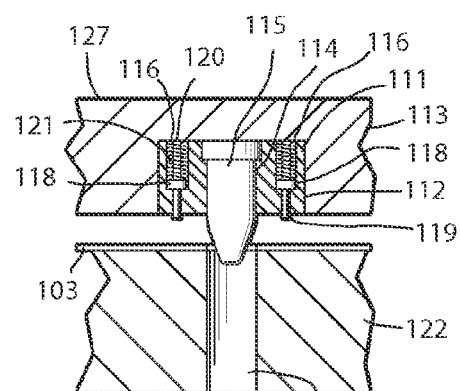
FIG. 11 is a partially schematic cross-sectional view of another prior art pilot.
Figure 12:
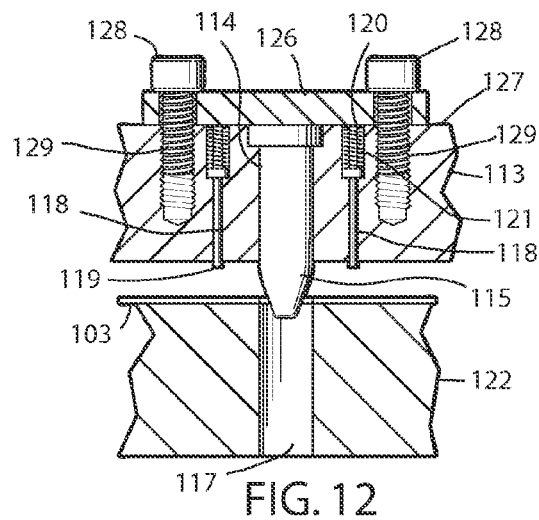
FIG. 12 is a partially schematic cross-sectional view of yet another prior art pilot.
Figure 13:
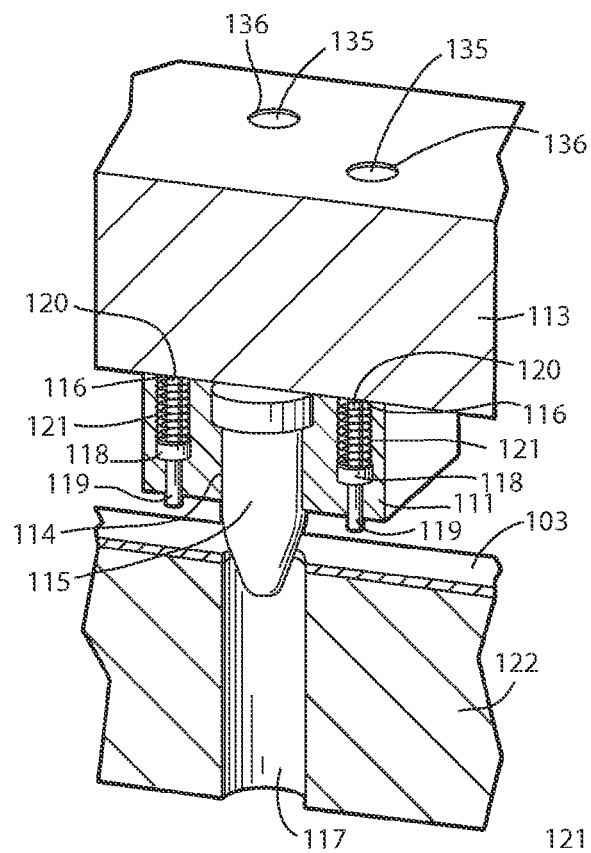
FIG. 13 is a perspective view of another prior art pilot.
Figure 14:
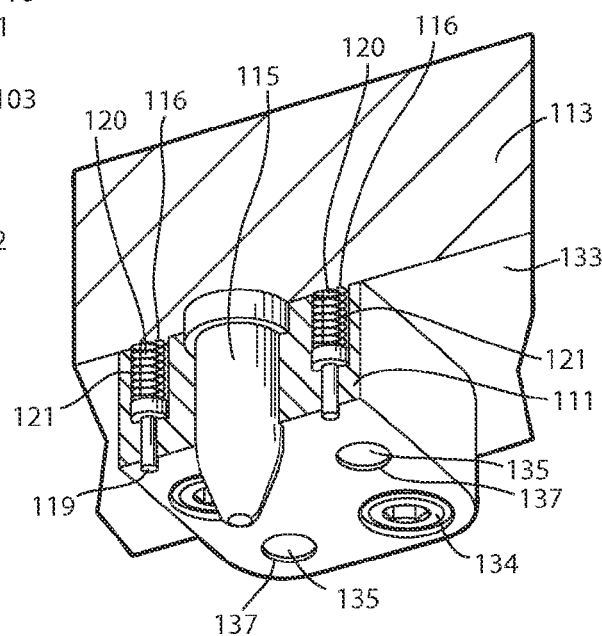
FIG. 14 is a perspective view of the prior art pilot shown in FIG. 13.
Figure 15:
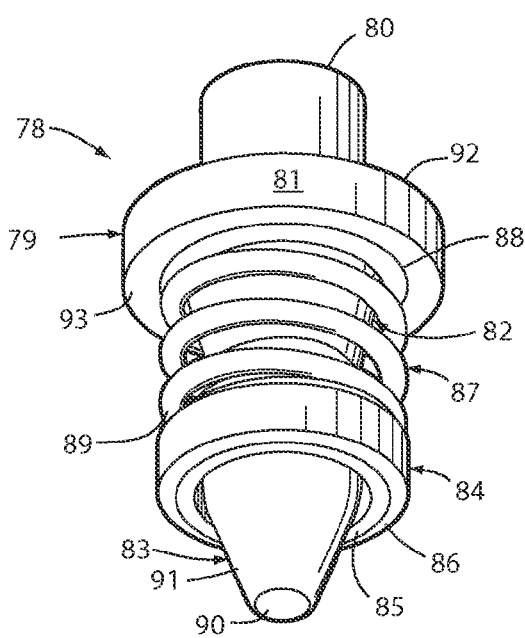
FIG. 15 is a perspective view of another embodiment of a modular pilot assembly embodying the present invention.

A window mount 60 may be used to help secure the pilot assembly 1 to the one die member 3. The window mount has an aperture 62 (FIG. 5) with a larger diameter portion 63 and a smaller diameter portion 64, thus forming a shoulder 65 in the aperture 62. The window mount includes a fastener opening 68 and can optionally include a dowel opening 66. When the window mount 60 is used for installing the pilot assembly 1 on the one die member 3, fastener apertures 70 are machined into the one die member 3. Optionally, if dowels 75 are going to be used in the installation, dowel holes 72 are also machined into the one die member 3 as shown in FIG. 6. When the inner end surface 61 of the window mount 60 is placed against the lower surface 56 of the one die member 3, the window mount can be used to secure the pilot assembly 1 to the one die member 3 as shown in FIG. 7. A fastener 74 is inserted through the fastener opening 68 in the window mount 60 and secured into the fastener opening 70 in the one die member 3. Optionally, a dowel 75 can be inserted to help locate the window mount 60 on the one die member 3. The dowel 75 is inserted into dowel opening 66 on the window mount 60 and into dowel opening 72 on the one die member 3 as shown in FIGS. 7 and 8.

The term "die member," as used herein, refers to any portion of a metal forming die or die set, including, but not limited to, an upper die member or a die shoe, a lower die member or a die shoe, and all other die components, whether stationary or reciprocating, including a reciprocating pressure pad, or the like. In the illustrated example, the pilot assembly 1 is shown mounted in a reciprocating upper die pad 3 located above a lower stationary die shoe 4. However, as will be appreciated by those skilled in the art, pilot assembly 1 can be mounted in other types of die members and/or components in a variety of different positions and orientations, as necessary to precisely locate the stock strip 5 in the various workstations 102 of a metal forming die 100.

The illustrated pilot 10 has a one-piece construction formed from a solid bar of rigid material, such as metal or the like. Preferably, all machining operations on the solid bar of rigid material are made during a single machine setup, so as to achieve greater accuracy and consistency of the pilot 10, as well as reduced manufacturing costs. In addition, the illustrated stripper 34 has a one-piece construction formed from a solid bar of rigid material, such as metal or the like. Again, preferably all machine operations on the solid bar rigid material are made during a single machine setup, so as to achieve greater accuracy and consistency of the stripper 34 as well as reduce manufacturing costs.

As best illustrated in FIGS. 1-3A, the outer end portion 11 of the pilot 10 has a relatively bullet-like profile, with a tapered nose 28 that ends to a relatively small, circular flat tip 30. However, a wide variety of differently sized and shaped outer end portions 11 of pilot 10 can be used in accordance with the desires of the die maker and/or die user.

In addition, the modular pilot assembly 1 can be used with different sized window mounts 60. The thickness and shape of the window mount 60 can be changed. The illustrated window mount 60 has a one-piece construction formed from a solid bar of rigid material, such as metal or the like. In addition, the machining to create surfaces to secure the pilot assembly 1 to the die member 3 using a window mount 60 may be modified. For example, the die member 3 may also be machined to closely receive a portion of the pilot 10.

The illustrated spring member 12 comprises a conventional closed coil spring, which may have partially flattened or ground ends 14, 16 to more securely abut a surface 25 on the pilot 10 and the surface 40 on the stripper 34.

The illustrated fastener 74 comprises a conventional socket head cap bolt having a tool engaging socket 76 in the outer face of the fastener 74, and a threaded shank portion 71. The threaded shank portion 71 can include a self-locking nylon patch 176 (see FIG. 20) which prevents fastener 74 from inadvertently loosening from its tightened condition in die member 3 and window mount 60. However, the fastener may be any fastener, including but not limited to a bolt or screw. The inner surface 73 of the head of the fastener 74 may abut a shoulder in the fastener aperture 68 of window mount 60. As illustrated, the threaded fastener aperture 70 in the die 3 is designed to receive a portion or all of the threaded shank 71 of the fastener 74 depending upon the depth of the shoulder in the fastener aperture 60 of the window mount 60 and whether there is a threading in the fastener aperture 68. Also, as discussed below, the inner surface 73 of the head of the fastener 74 may be used to secure the pilot assembly 1 directly to the one die member 3 without the use of a window mount. In addition, a washer may be used with the fastener 74.

With reference to FIGS. 6-8, the assembled pilot assembly 1 is quickly and easily installed in the illustrated upper die pad 3 in the following manner. Once the assembled pilot 1 is placed in the appropriate spot on the upper die member 3, the window mount 60 is placed over the pilot 10 so that the inner end surface 61 of the window mount 60 abuts the lower surface 56 of the one die member 3 (see FIG. 6). The inner end portion 15 of the pilot 10 fits closely within the aperture 62 (FIG. 5) of the window mount 60. As illustrated in FIGS. 1, 7, and 8, at least a portion of the stripper 34 extends beyond the outer end surface 67 of the window mount 60. One or more fasteners 74 are used to secure the window mount 60 to the die 3. Optionally, one or more dowels 75 can be used to help locate the window mount 60 on the lower surface 56 of the die 3 as described above.

FIGS. 15-24 illustrate another embodiment of a pilot assembly 78 and various ways of mounting that pilot assembly 78 to the one die member 3. The pilot assembly 78 includes a pilot 79 with an inner end portion 81, a medial portion 82, and an outer end portion 83. The outer end portion 83 includes a tapered nose 91 with a generally circular tip 90. The medial portion 82 (shown in FIGS. 16-18) includes a generally annular groove 95. The medial portion 82 can include a necked portion 96, with a smaller cross-sectional area, where the medial portion 82 tapers from the groove 95 to the neck 96 and from the outer end portion 97 of the medial portion 82 to the neck 96. The tapered design on the medial portion 82 allows the stripper 84 to tip and not bind on the pilot 79. The inner end portion 81 has an outer diameter 81d. A generally circular stud 80 can extend inwardly from the inner end portion 81. The stud 80 has an outer diameter 80d that is less than the outer diameter 81d of the inner end portion 81, thus forming an annularly shaped, radially-oriented shoulder 92. The inner end surface 93 of the inner end portion 81 of the pilot 79 also forms an annularly shaped, radially-oriented shoulder between the outside diameter 81d of the inner end portion 81 and the outside diameter 97d of the outer end portion 97 of the medial portion 82 of the pilot 79.

A spring member 87, with an inner end 88 and an outer end 89 is received over the pilot 79. The inner end 88 of the spring member 87 abuts surface 93 of the pilot 79.

Figure 17:
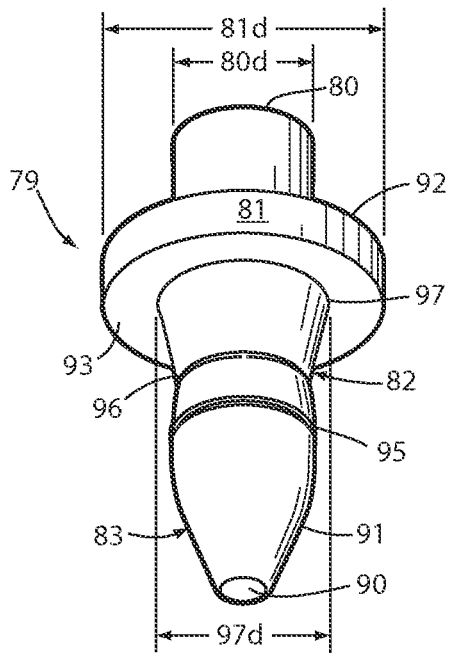
FIG. 17 is a vertical cross-sectional view of the pilot assembly of FIG. 15 engaged with a stock strip prior to the die members converging.
Figure 17:
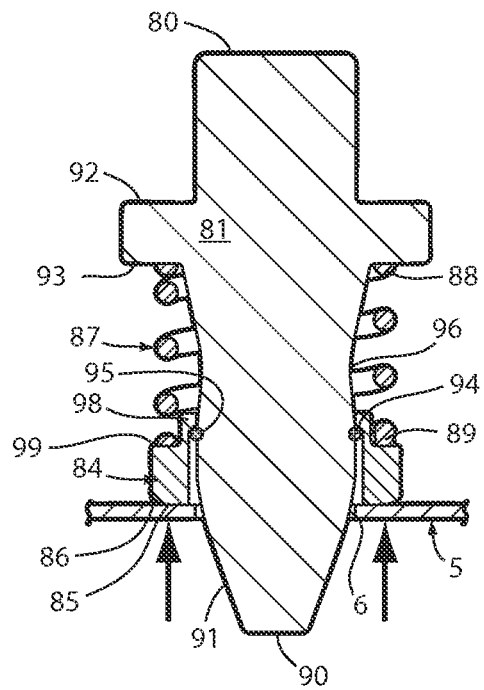
Figure 16:
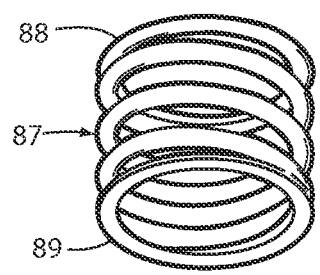
FIG. 16 is an exploded perspective view of the pilot assembly shown in FIG. 15.
Figure 16:
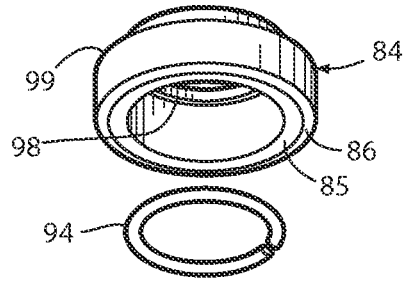
Figure 18:
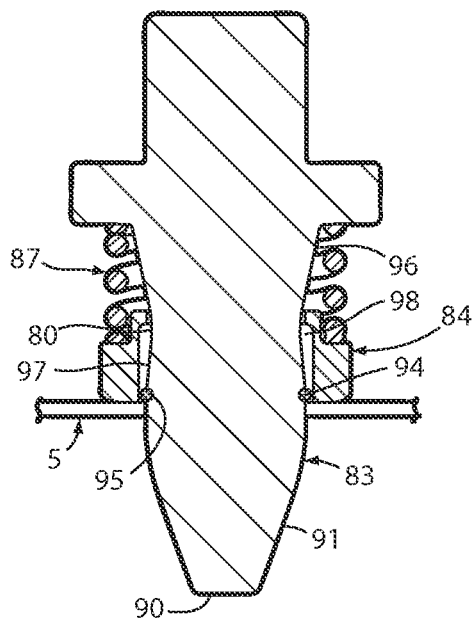
FIG. 18 is a vertical cross-sectional view of the pilot assembly of FIG. 15 after the die members converge.

The stripper 84 has an outer end portion 85 that may include a tapered portion 86. As discussed above, the stripper includes an annularly shaped, radially-oriented outer shoulder 99 for engaging the outer end 89 of the spring member 87 and a generally annularly shaped, radially-oriented inner shoulder 98 for engaging the retainer ring 94 when the retainer ring 94 is installed in the annular groove 95 and the die members are diverged as shown in FIG. 17. When the die members start to converge, as shown by the arrows in FIG. 17, the spring member 87 becomes compressed as shown in FIG. 18. When the spring member is compressed, the inner shoulder 98 of the stripper 84 no longer engages the retainer ring 94 and the stock strip 5 closely fits onto the cylindrical portion of the pilot 79 where the outer end portion 83 transitions to the medial portion 82.

Figure 19:
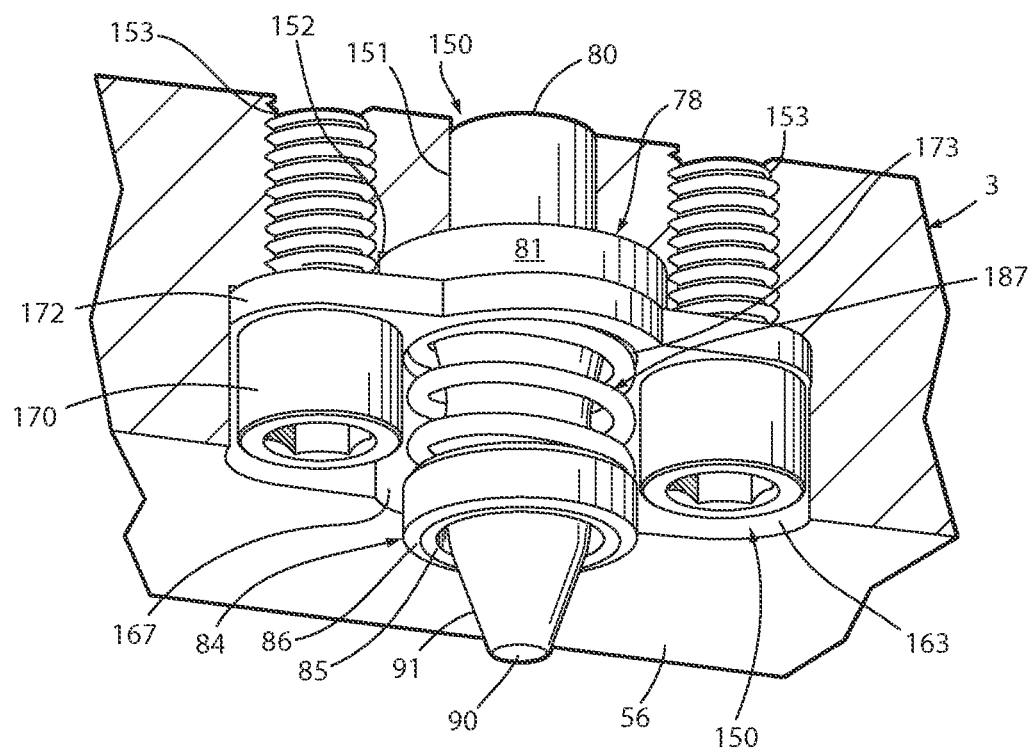
FIG. 19 is a perspective view of the pilot assembly of FIG. 15 shown installed on a die member.
Figure 20:
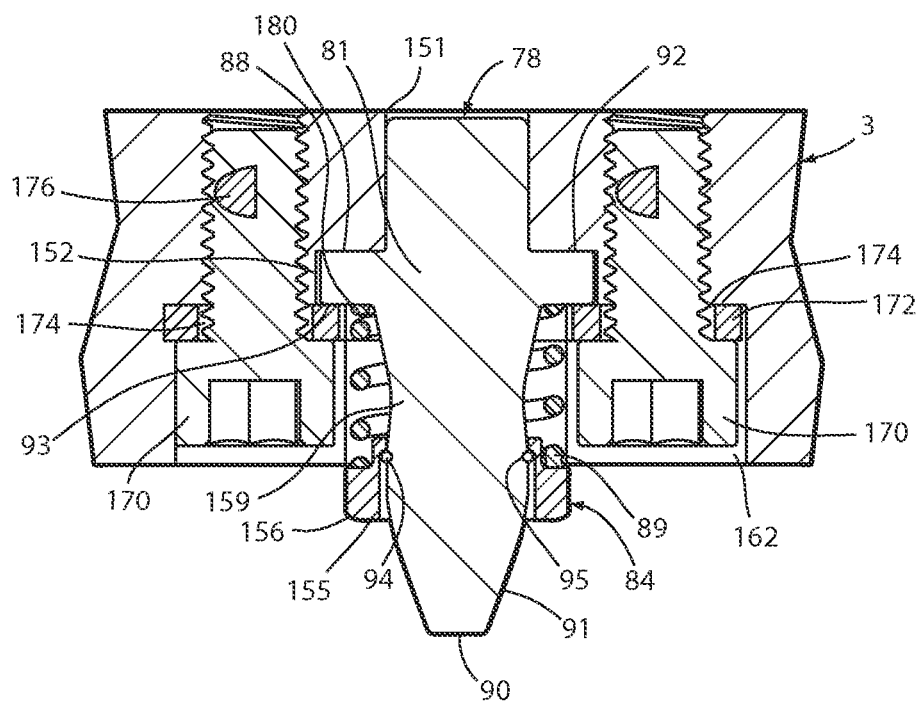
FIG. 20 is a vertical cross-sectional view of the pilot assembly shown in FIG. 19.

As illustrated in FIGS. 19 and 20, the pilot assembly 78 can be installed onto the one die member 3. An aperture 150 is machined onto the one die member 3 for receiving the pilot assembly 78. The aperture 150 has a smaller diameter portion 151 to closely receive the stud portion 80 of the pilot assembly 78. In addition, the aperture 150 has a larger diameter portion 152 that closely receives the inner end portion 81 of the pilot assembly 78. Aperture 150 also includes space 167 for receiving the pilot assembly 78 as well as space 163 for receiving a retainer 172 with the associated fasteners 170. The aperture 150 includes a space 163 that is generally larger, but closely shaped to, the retainer 172 in the area of the fasteners 170. Threaded fastener openings 153 are machined into the one die member 3.

The retainer 172 has fastener apertures 174 and a pilot aperture 173. Threaded fasteners 170 are used to secure the retainer ring 172 and the pilot assembly 78 to the one die member 3. The fasteners 70 have threaded shanks and can optionally include a self-locking nylon patch 176 as described above. As illustrated in FIG. 20 when the pilot assembly 78 is secured to the upper die member 3 utilizing the retainer 172 and associated fasteners 170, the shoulder 92 on the pilot assembly 78 abuts a surface 180 on the die member 3, while the surface 93 of the pilot assembly 78 abuts a surface on the retainer 172 to press fit the pilot assembly 78 into the one die member 3.

Figure 21:
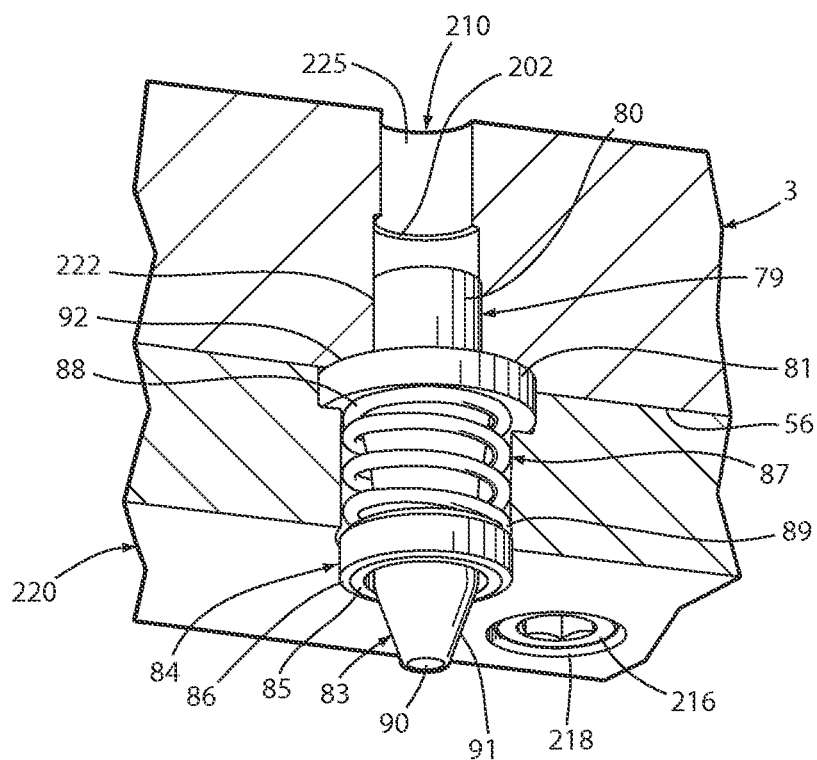
FIG. 21 is a perspective view of the pilot assembly of FIG. 15 shown installed on a die member using a window mount.
Figure 22:
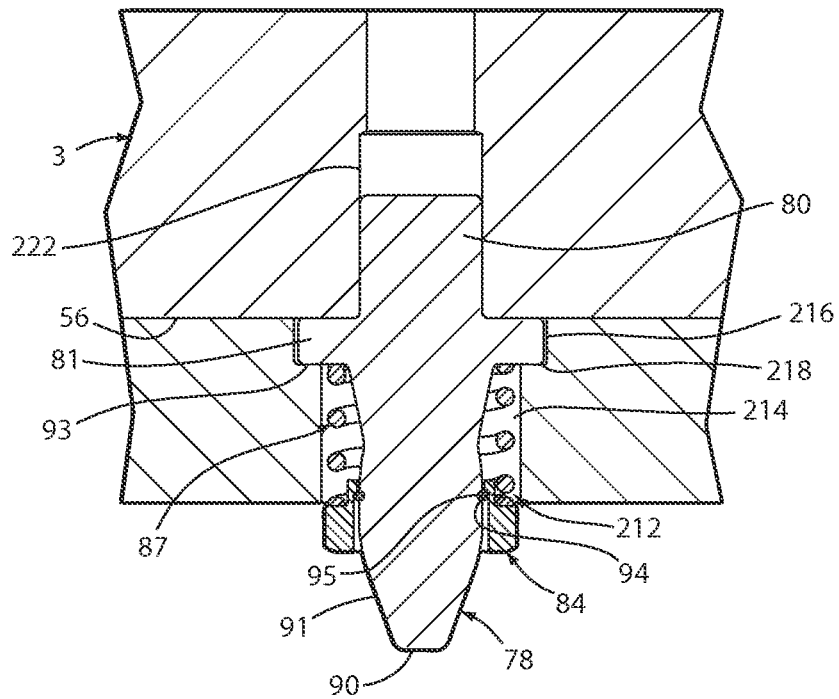
FIG. 22 is a vertical cross-sectional view of the pilot assembly shown in FIG. 21.
Figure 23:
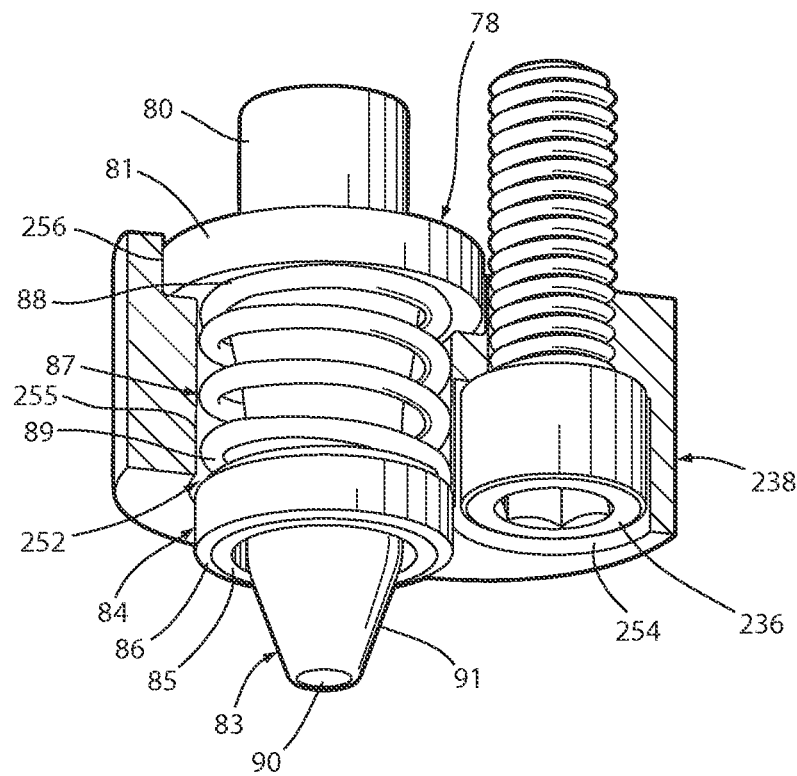
FIG. 23 is a perspective view of the pilot assembly of FIG. 15 with another window mount.
Figure 24:
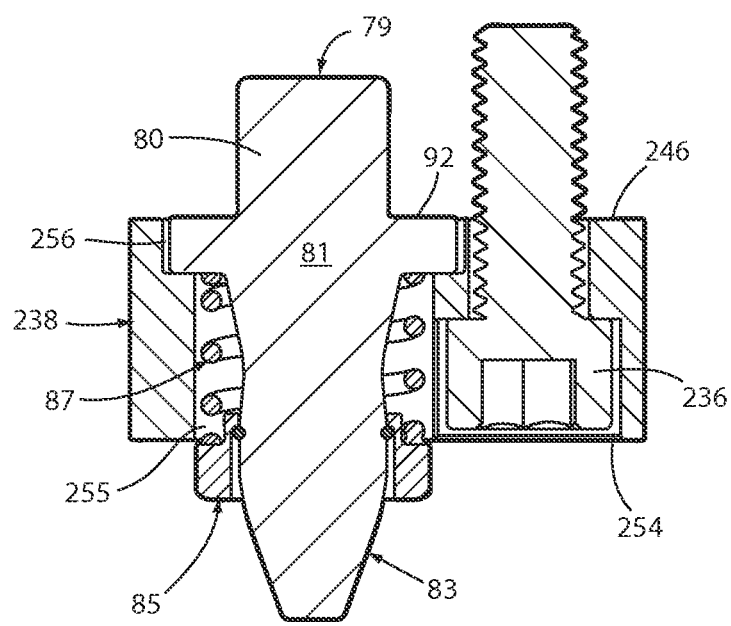
FIG. 24 is a vertical cross-sectional view of the pilot assembly shown in FIG. 23.

Yet another way of securing the pilot assembly 78 is shown in FIGS. 21 and 22. An aperture 210 is machined into the one die member 3 to include a generally cylindrical wall 222 that closely receives the outer wall of stud 80. In addition, the aperture 210 can include a smaller diameter opening 225 so that a shoulder 202 is created within upper die member 3. The length of the stud 80 determines whether or not it touches the shoulder 202. The shoulder 92 on the inner end portion 81 of the pilot 79 is received on the lower surface 56 of the one die member 3. A window mount 220 has an aperture 212 with a larger diameter opening 216 and a smaller diameter opening 214. The smaller diameter opening 214 closely receives, but does not restrict movement of the spring member 87. The larger diameter opening 216 closely receives the inner end portion 81 of the pilot 79 such that the shoulder 93 of the inner end portion 81 abuts a shoulder 218 on the window mount 220. As illustrated in FIG. 21 a fastener 216 can be inserted through a fastener opening 218 in window mount 220 and secured in the one die member 3 in order to secure the window mount 220 and the associated pilot assembly 78 to the one die member 3.

The pilot assembly 78 may also be secured using a different style window mount 238 (FIGS. 23-24) that contains an aperture 252 for receiving the pilot assembly 78 and an aperture 254 for receiving the fastener 236. The aperture 252 for securing the pilot includes a smaller diameter aperture 255 and a larger diameter aperture 256. The larger diameter aperture 256 is shaped to closely receive the inner end portion 81 of the pilot 79. The smaller diameter portion 255 is designed to receive the medial portion 82 of the pilot 79 and the spring member 87, without restricting movement of the spring member 87. The inner end surface 246 of the window mount 238 should be generally flush with the shoulder 92 of the inner end portion 81 of the pilot 79 such that the inner end portion 246 and the shoulder 92 can abut the lower surface 56 of the one die member 3 when the pilot assembly 78 is installed on to the one die member 3. An aperture for the stud 80 and a threaded aperture for the fastener 236 are machined into the upper die member 3 (not shown in FIGS. 23 and 24) to facilitate installation of the pilot assembly 78 and window mount 238.

Figure 25:
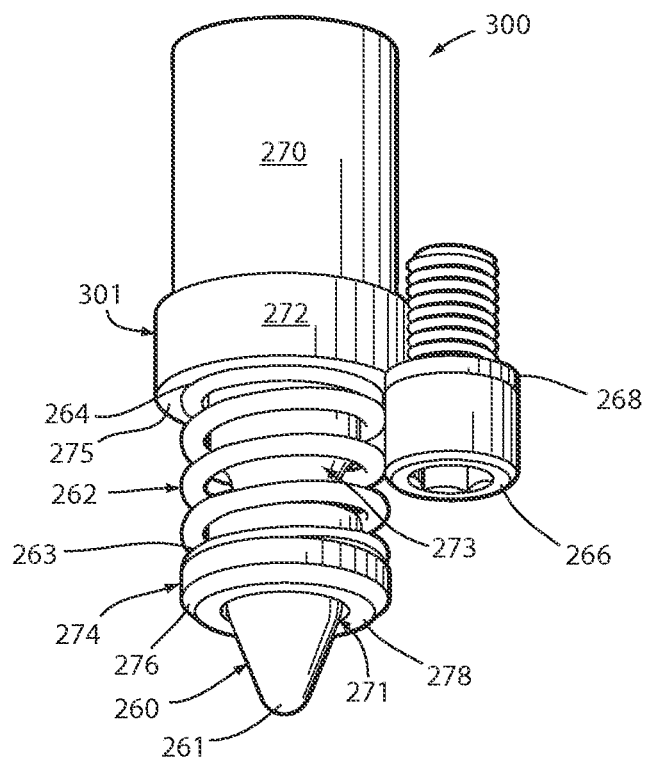
FIG. 25 is a perspective view of another embodiment of a modular pilot assembly embodying the present invention.
Figure 26:
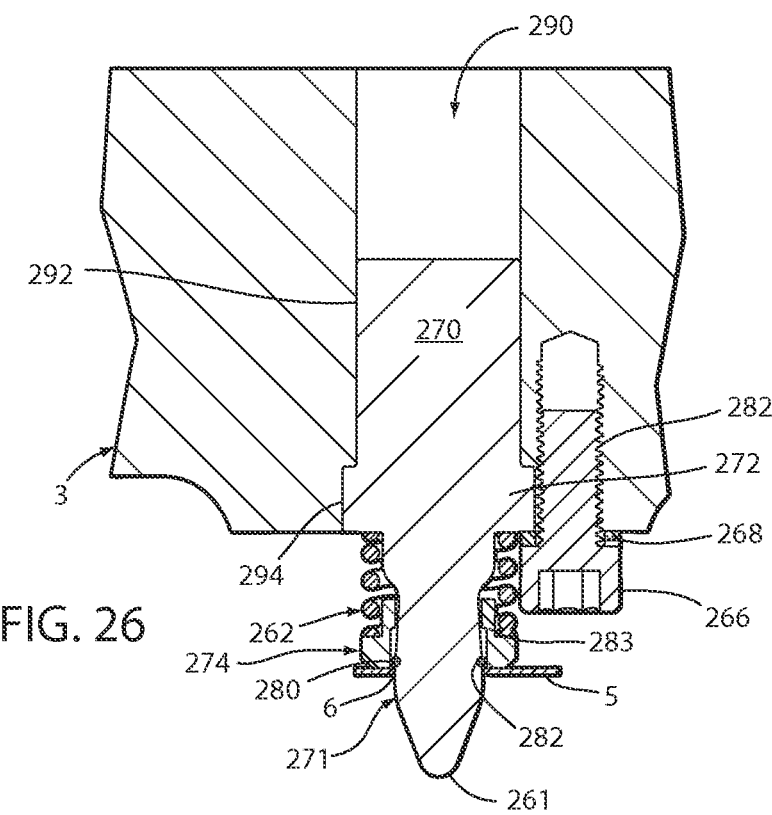
FIG. 26 is a vertical cross-sectional view of the pilot assembly shown in FIG. 25, shown installed on a die member.

Another illustrated embodiment of a pilot assembly 300, shown in FIGS. 25 and 26, includes a pilot 301 with an inner end portion 270, an outer end portion 271, and a medial portion 272. The pilot 301 includes a stud portion 270 extending from the inner end portion 272. The outer end portion 271 includes a tapered portion 260 and that extends to a rounded point 261. A stripper 274 includes an outer end surface 278 with a tapered portion 276. A spring member 262 includes an inner end portion 264 and an outer end portion 263. The inner end portion 264 of the spring member 262 abuts surface 275 of the inner end portion 272 of pilot 301. The stripper 274 includes an inner shoulder 283 that abuts the retainer ring 280 when the retainer ring 280 is retained on groove 282 on the medial portion 273 of the pilot 301 in the same manner as described above.

An aperture 290 having a larger diameter opening 294 and a smaller diameter opening 292 is formed in the one die member 3. The smaller diameter opening 292 is designed to closely engage the outer diameter of the stud 270. The smaller diameter opening 294 is designed to closely receive the outer diameter of the inner end portion 272. As shown in FIG. 26, the pilot assembly 300 is secured via fastener 266 to upper die member 3 by installation of the fastener 266 into a threaded fastener aperture 282 in the one die member 3.

A washer 268 may be used with the threaded fastener 266 to secure the pilot assembly 300 to the one die member 3. As shown in FIG. 26, when the die members diverge, the stock strip 5 moves inwardly up the upper end portion 271 and the opening 6 in the stock strip is closely received on the pilot 301. Also, as shown in FIG. 26, when the spring member 262 becomes compressed, the retainer ring 280 moves away from the shoulder 283 in the stripper 274.

The pilot assemblies 1, 78, and 300 may be readily removed from die member 3 by simply reversing the sequence of the installation steps described above.

FIG. 1 illustrates the operation of pilot assembly 1. The upper die member 3 with pilot assembly 1 mounted therein is positioned to converge against the stock strip 5 that is supported on the upper surface 58 of the lower die member 4. In this position, the stripper 34 is fully extended, and has yet to abut against the upper surface of the stock strip 5. When the die members 3, 4 begin to converge, the tapered nose 28 of the pilot 10 is received through the most closely aligned one of the pilot holes 6 in stock strip 5 and into the female pilot portion 9 in the bottom or lower die member 4. Next, the upper die pad 3 converges or closes completely against the stock strip 5 and lower die member 4 supporting the same, such that the abutting contact between the stripper 34 and the upper surface of the stock strip 5 overcome the biasing force of pretensed spring member 12, further compressing spring member 12, while shifting and/or retracting the stripper 34 back toward the interior of the outer end portion 11 of pilot 10. The tip 30, tapered nose 28, and most if not all of the remaining generally cylindrical portion of the outer end portion 11 of the pilot 10 is thus received in the aligned pilot hole 6 in stock strip 5 and the female pilot portion 9 in the bottom die member 4. The metal forming operation in the associated die work station is then completed with the pilot assembly 1 such that the stock strip 5 is precisely located and securely held in place during formation and further processing of stock strip 5. As the upper die member 3 diverges or moves away from the stock strip 5 and the lower die member 4, the resilient force generated by spring member 12, urges the stripper 34 back outwardly toward and abuttingly against the stock strip 5 and separates or strips the stock strip 5 from the pilot 10, such that the stock strip 5 can then be quickly shifted longitudinally to the next work station for further processing.

The pilot assemblies 78 and 300 operate in a similar manner as shown in FIGS. 17, 18, 25, and 26.

As will be appreciated by those skilled in the art, pilot assemblies 1, 78, and 300 can be provided in a wide variety of different sizes to accommodate many different metal forming die applications. The all-in-one, modular construction of pilot assemblies not only provides a self-contained stock stripper that uses only one spring, but can be quickly and easily installed in a die member using simple machining techniques, a window mount and/or one or more mounting screws.

Pilot assemblies 1, 78, and 300 have an uncomplicated construction with relatively few components and are therefore quite durable and economical to manufacture. The mounting screw(s) and optional window mount attachment of the pilot assemblies to an associated die member provides quick and easy installation and removal of the pilot assemblies. The spring member and assembly are backed up or axially supported by the die member itself for greater strength and convenience. Pilot assemblies 1, 78, and 300 positively separate the stock strip from the die during operation of the metal forming die, and provide a very compact, low profile shape that can be used at various locations and orientations on the various die members. The installation of the pilot assemblies can be achieved with simple machining, so as to reduce installation time and cost. The shape of the assemblies can be configured, so as to accommodate many different applications and users.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. In a multi-station progressive metal forming die having at least two mutually converging and diverging die members between which an elongate stock strip is shifted longitudinally to form parts from the stock strip, the improvement of a modular pilot assembly with self-contained stripper, comprising:

a pilot configured for operable support on one of the die members and having an outer end portion oriented toward the stock strip, an oppositely disposed inner end portion oriented away from the stock strip, and a medial portion disposed axially between said outer and inner end portions, wherein:

said outer end portion has a generally tapered nose to engage the pilot hole in the stock strip and guide the same to a predetermined position in an associated die forming station;

said inner end portion has a generally cylindrical shape, with a flat surface for engaging a surface of the one die member;

a spring member having a generally hollow interior that is received over said medial portion, an outer end oriented toward the stock strip, and an opposite inner end oriented away from the stock strip and positioned adjacent a surface on the pilot;

a stripper with an outer collar portion with an outer end surface oriented toward the stock strip and a generally cylindrical first sidewall with a first outside diameter, an inner collar portion with an inner end surface oriented away from the stock strip and a generally cylindrical second sidewall with a second outside diameter which is less than said first outside diameter of said first sidewall of said outer collar portion and defines an annularly shaped, radially oriented shoulder there between for engaging the outer end of said spring member; wherein:

said outer collar portion has a first inner diameter;

said inner collar portion has a second inner diameter which is less than said first inner diameter of said outer collar portion and defines an annularly shaped, radially oriented inner shoulder there between; and a retainer operably connected on the pilot to maintain the stripper on the pilot assembly by engaging the inner shoulder of the stripper when the die members are diverged.

2. A metal forming die as set forth in claim 1, including:

a retainer for operably supporting said pilot on the one die member to define an installed condition, and having:

a portion with at least one fastener aperture extending laterally therethrough;

at least one fastener positioned in said fastener aperture of said retainer and having a threaded shank portion configured for anchoring in the one die member to securely, yet detachably retain said retainer on the one die member; and a portion with a pilot aperture for receiving said pilot.

3. A metal forming die as set forth in claim 2, wherein:

said retainer is a single piece.

4. A metal forming die as set forth in claim 2, wherein:

said pilot aperture receives the medial portion of the pilot.

5. A metal forming die as set forth in claim 1, wherein:

said one die member includes an aperture for receiving the inner end portion of the pilot.

6. A metal forming die as set forth in claim 1, wherein:

said pilot has a one-piece construction formed from a solid bar of rigid material.

7. A metal forming die as set forth in claim 1, wherein:

said retainer is operably connected on an annular groove on the medial portion of the pilot.

8. A metal forming die as set forth in claim 2, wherein:

said pilot opening engages a shoulder that is formed on the pilot.

9. A modular pilot assembly with self-contained stripper for multi-station progressive metal forming dies having at least two mutually converging and diverging die members between which an elongate stock strip is shifted longitudinally to form parts from the stock strip, comprising:

a pilot configured for operable support on one of the die members and having an outer end portion oriented toward the stock strip, an oppositely disposed inner end portion oriented away from the stock strip, and a medial portion disposed axially between said outer and inner end portions, wherein:

said outer end portion has a generally tapered nose to engage the pilot hole in the stock strip and guide the same to a predetermined position in an associated die forming station;

said inner end portion has a generally cylindrical shape, with a flat surface for engaging a surface of the one die member;

a spring member having a generally hollow interior that is received over said medial portion, an outer end oriented toward the stock strip, and an opposite inner end oriented away from the stock strip and positioned adjacent a surface on the pilot;

a stripper with an outer collar portion with an outer end surface oriented toward the stock strip and a generally cylindrical first sidewall with a first outside diameter, an inner collar portion with an inner end surface oriented away from the stock strip and a generally cylindrical second sidewall with a second outside diameter which is less than said first outside diameter of said first sidewall of said outer collar portion and defines an annularly shaped, radially oriented shoulder there between for engaging the outer end of said spring member; wherein:

said outer collar portion has a first inner diameter;

said inner collar portion has a second inner diameter which is less than said first inner diameter of said outer collar portion and defines an annularly shaped, radially oriented inner shoulder there between; and a retainer operably connected on the pilot to maintain the stripper on the pilot assembly by engaging the inner shoulder of the stripper when the die members are diverged.

10. A modular pilot assembly as set forth in claim 9, including:

a retainer for operably supporting said pilot on the one die member to define an installed condition, and having:

a portion with at least one fastener aperture extending laterally therethrough;

at least one fastener positioned in said fastener aperture of said retainer and having a threaded shank portion configured for anchoring in the one die member to securely, yet detachably retain said retainer on the one die member; and a portion with a pilot aperture for receiving said pilot.

11. A modular pilot assembly as set forth in claim 10, wherein:

said pilot aperture receives the medial portion of the pilot.

12. A modular pilot assembly as set forth in claim 9, wherein:

said one die member includes an aperture for receiving the inner end portion of the pilot.

13. A modular pilot assembly as set forth in claim 9, wherein:

said pilot has a one-piece construction formed from a solid bar of rigid material.

14. A modular pilot assembly as set forth in claim 9, wherein:

said retainer is operably connected on an annular groove on the medial portion of the pilot.

15. A modular pilot assembly as set forth in claim 10, wherein:

said retainer is a single piece.

16. In a method for making a multi-station progressive metal forming die having at least two mutually converging and diverging die members between which an elongate stock strip is shifted longitudinally to form parts from the stock strip, with the improvement of at least one modular pilot assembly for precisely locating the stock strip in the die stations, comprising:

forming a pilot for operable support on one of the die members with an outer end portion oriented toward the stock strip, an oppositely disposed inner end portion oriented away from the stock strip, and a medial portion disposed axially between the outer and inner end portions, and including:

forming the outer end portion with a generally tapered nose to engage the pilot hole in the stock strip and guide the same to a predetermined position in an associated die forming station;

forming the inner end portion with a generally cylindrical shape, with a flat surface for engaging a surface of the one die member;

selecting a spring member with a generally hollow interior, an outer end oriented toward the stock strip, and an opposite inner end oriented away from the stock strip;

positioning the hollow interior of the spring member onto and over the medial portion of the pilot;

forming a stripper with an outer collar portion with an outer end surface oriented toward the stock strip and a generally cylindrical first sidewall with a first outside diameter, an inner collar portion with an inner end surface oriented away from the stock strip and a generally cylindrical second sidewall with a second outside diameter which is less than said first outside diameter of said first sidewall of said outer collar portion to define an annularly shaped, radially oriented shoulder there between for engaging the outer end of said spring member, including:

forming the outer collar portion to have a first inner diameter; and forming the inner collar portion to have a second inner diameter which is less than said first inner diameter of said outer collar portion and defines an annularly shaped, radially oriented inner shoulder there between;

positioning the stripper over the pilot;

selecting a retainer ring that fits securely onto the pilot; and positioning the retainer ring on the pilot to maintain the stripper on the pilot by engaging the inner shoulder of the stripper when the die members are diverged;

forming a generally plate shaped window mount for operably retaining the pilot in the pilot mounting aperture in said one die member in an installed condition, and including:

forming at least one fastener aperture in a marginal portion of the window mount which extends laterally therethrough;

positioning at least one threaded fastener in the fastener aperture of the said window mount with the threaded shank portion thereof anchored in the fastener mounting aperture in the one die member to securely, yet detachably retain said window mount on the one die member; and forming a pilot mounting pocket in a central portion of the window mount for receiving said pilot, whereby the stripper automatically reciprocates between the retracted and extended positions relative to the pilot during operation of the metal forming die to insure that the stock strip is consistently stripped away from the outer end portion of the pilot.

17. A method for making a multi-station progressive metal forming die as set forth in claim 16, wherein:

said pilot has a one-piece construction formed from a solid bar of rigid material.

18. A method for making a multi-station progressive metal forming die as set forth in claim 16, wherein:

said retainer ring comprises a C-ring.

19. A method for making a multi-station progressive metal forming die as set forth in claim 16, including:

forming an aperture in the one die member to receive a portion of the pilot.

20. A method for making a multi-station progressive metal forming die as set forth in claim 16, wherein:

said window mount has a one-piece construction formed from a solid bar of rigid material.

\* \* \* \* \*